United States Patent [19]

Rye

[11] Patent Number: 4,668,443
[45] Date of Patent: May 26, 1987

[54] CONTACT BODIES
[75] Inventor: Palle Rye, Reading, Pa.
[73] Assignee: Brentwood Industries, Inc., Reading, Pa.
[21] Appl. No.: 801,457
[22] Filed: Nov. 25, 1985
[51] Int. Cl.$^4$ ............................................. B01D 47/00
[52] U.S. Cl. .................................. 261/112; 165/166; 428/183; 428/185
[58] Field of Search ..................... 261/112; 165/166; 428/183, 185, 131

[56] References Cited

U.S. PATENT DOCUMENTS

| | | | |
|---|---|---|---|
| 2,793,017 | 5/1957 | Lake | 261/112 |
| 2,940,736 | 6/1960 | Odman | 257/245 |
| 2,977,103 | 3/1961 | Smith | 261/111 |
| 3,260,511 | 7/1966 | Greer | 261/112 |
| 3,262,682 | 7/1966 | Bredberg | 261/29 |
| 3,281,307 | 10/1966 | Moeller | 161/68 |
| 3,415,502 | 12/1968 | Munters | 261/112 |
| 3,475,012 | 10/1969 | Britton | 261/112 |
| 3,540,702 | 11/1970 | Uyama | 261/112 |
| 3,574,103 | 4/1971 | Latkin | 161/43 |
| 3,599,943 | 8/1971 | Munters | 261/112 |
| 3,733,063 | 5/1973 | Loetel | 261/112 |
| 3,830,684 | 8/1974 | Hamon | 161/68 |
| 3,963,810 | 6/1976 | Holmberg | 261/112 |
| 3,965,225 | 6/1976 | Schinner | 261/79 A |

OTHER PUBLICATIONS

"PLASdek ® Cooling Tower Fill," Munters product bulletin, MF-3RR1184.
Munters Corporation Bulletin 7305.25.
Munters product description pamplet.

Primary Examiner—Bernard Nozick
Attorney, Agent, or Firm—Panitch Schwarze Jacobs & Nadel

[57] ABSTRACT

Improved gas liquid contact sheets and contact bodies are disclosed comprising a plurality of parallel and generally vertical corrugated contact sheets, wherein the corrugations form alternating apices in the sheets, the corrugations being disposed at an angle to the horizontal and wherein the corrugations are substantially parallel and adjacent sheets are oriented such that corrugations of one sheet cross the corrugations of an adjacent sheet at intersections of the apices, the improvement comprising positioner pads positioned in apices of the corrugations of the contact sheets, such that at least about eighty percent of the intersections of adjacent sheets contain abutting pairs of the positioner pads. In addition, contact bodies in which adjacent sheet corrugations intersect proximate the edges of the contact sheets are provided.

10 Claims, 3 Drawing Figures

CONTACT BODIES

BACKGROUND OF THE INVENTION

1. Field of the Invention

This invention relates to a gas and liquid contact body and to sheets for forming a contact body. More particularly, this invention relates to a novel arrangement for securing together corrugated sheets forming a contact body. Contact bodies frequently are used as fill for promoting heat transfer or heat and mass transfer from a liquid, such as water, to a concurrent-flowing, cross-flowing or counter-flowing gas, such as air. The contact bodies of the present invention are useful as fill for cooling towers, media for evaporative cooling, media for trickling filters for promoting biological oxidation of contaminants and pollutants in water and waste water treatment, fill for gas scrubbers for reducing airborne pollution, and the like.

2. Description of The Prior Art

Contact bodies typically are used as fill materials which promote the intimate mixture of and heat exchange between two counter-flowing or cross-flowing fluid streams. Contact bodies for gas and liquids, which are composed of layers or sheets made with folds between sheets with channels or passageways penetrating through the contact body so formed, are known in the art. For example, U.S. Pat. No. 3,262,682 discloses contact bodies consisting of thin sheets or layers which are folded or corrugated and which are disposed vertically. The corrugations extend at an oblique angle relative to the horizontal plane. Alternate layers have corrugations positioned obliquely in one direction with adjacent layers having their corrugations extending in opposite directions. The sheets may be interconnected at the places of contact by means of an adhesive such as a phenolic aldehyde resin. In operation, a liquid, such as water to be cooled, is sprayed on top of the contact body and travels down through it by gravity. A counter current of air is blown into or sucked through the open ends of the corrugations on one side of the contact body. Preferably, the layers or sheets are liquid- or water-absorbing and may be made of fibers of cellulose or an inorganic material such as asbestos. The sheets may also be made of a rigid plastic material such as unplasticized polyvinylchloride.

U.S. Pat. No. 3,599,943 discloses another gas and liquid contact body made of corrugated sheets. Each adjacent sheet has oppositely angled oblique major corrugations. The sheets are held together by rods passing through slots formed near the edges of the sheets.

U.S. Pat. No. 3,963,810 discloses a contact body comprising contact plates which may be provided with a plurality of spacer members protruding from opposite faces of the contact plate (FIG. 4). The contact plates are arranged so that the spacer members of adjacent contact plates contact one another permitting the contact plates to be stacked such that the corrugations of adjacent sheets do not contact one another.

U.S. Pat. No. 2,977,103 discloses cooling plates or baffles having a series of spaced parallel ribs of arcuate cross section and having a plurality of protuberances arranged in transverse and longitudinal rows on the plate which serve to space and separate adjacent plates from one another. To prevent the protuberances of one plate from nesting with the protuberances of adjacent plates, alignment lugs are provided which project a greater distance from the surface of sheet than the protuberances, whereby, the convex portions of the lugs will nest within the concave depressions of the lugs of an adjacent plate. The protuberances and aligning lugs may be on the same side of the sheet or may be located on both sides if desired.

U.S. Pat. No. 3,540,702 teaches a packing material formed from sheets which are joined by projecting seats. The outwardly projecting joint seats are formed at the apex portion of the largest scale bend or corrugation of these multiwave sheets. The outermost surfaces of the seats may be attached to one another by welding or adhesive.

U.S. Pat. No. 3,260,511 discloses packing media made from adjacent alternating corrugated sheets and intermediate flat sheets which may be joined together by means such as pinning, cementing, high frequency welding, clamping or similar devices. For example, they may be held together by a press stud molded or otherwise formed on the peak of one corrugated sheet engaged with a corresponding hole formed in the peak of an adjacent corrugated sheet passing through a hole punched or otherwise formed in an intermediate flat sheet. The stud may have a frustoconical shape with a larger diameter at the butt end, or alternatively, the butt may have a larger diameter than the stud itself (FIG. 3A). Alternatively, the structure may be constructed with a stud formed on the peak of one corrugated sheet threaded through a corresponding hole in the flat sheet and cemented to a recessed butt formed on the peak of an adjacent corrugated sheet facing the opposite surface of the flat sheet.

U.S. Pat. No. 3,281,307 discloses packing media which is composed of a bundle of corrugated sheets having protuberances formed on the peaks and troughs of the corrugations such that each of the protuberances on the peaks of the corrugations interfit with the rear of the protuberances on the trough of an adjacent sheet. The interfitted protuberances may be adhesively bonded or heat sealed together.

U.S. Pat. No. 3,475,012 discloses a gas liquid contact unit comprising a stack of sheets wherein each sheet has a plurality of hollows and protuberances molded in it with respect to the medial plane in the sheet, the hollows and protuberances having the shape of a frustum of a pyramid or cone, the top faces of the protuberances in one sheet registering with the top faces of the protuberances in an adjacent sheet.

U.S. Pat. No. 3,830,684 discloses corrugated sheets for liquid and gas contact apparatus. The corrugated sheet has a plurality of ramp-like deformations which reduce liquid channelling and which contact flat sheets interspersed between the corrugated sheets.

U.S. Pat. No. 3,965,225 discloses spacer-turbulators for use in separating corrugated-type fill sheets used in cross flow cooling towers and for imparting turbulence to the air flowing through the fill. The spacer turbulator comprises raised mounds for maintaining each fill sheet apart from an adjoining sheet where the mound contacts the fill sheet at the base of the concave portion of the fill sheet and contacts the adjoining fill sheet at the base of its concave portion.

U.S. Pat. No. 2,793,017 discloses corrugated sheet elements which are reinforced by spaced ribs disposed transversely of the sheet and projecting from at least one face a distance less than the amplitude of a corrugation such that the ribs serve as spacers between the assembled elements. Cup-like indentations may be provided in each of the ribs, and a smaller indentation in the troughs of the corresponding corrugation in the next adjacent sheet, such that the indentations in the corrugation mate with the cups and the ribs. The cups may be filled with adhesive for bonding the sheets together.

U.S. Pat. No. 3,574,103 discloses a laminated cellular material form being a plurality of corrugated sheet elements in which apical portions in at least one side of one sheet are notched to receive apical portions of the corrugations of a second sheet oriented in a transverse relation. The sheets may be adhesively bonded together where they contact each other. When bonded, the cellular core material may be used as packing for heat exchanger cores.

U.S. Pat. No. 3,733,063 illustrates and describes cooling tower packing assemblies in which sheets include knobs and plateaus acting as spacing elements. Although the sheets may be shipped in a nested condition, when they are assembled, the sheets are rotated 180 degrees and the knobs are bonded to the plateaus of the next adjacent sheet.

U.S. Pat. No. 2,940,736 illustrates and describes a set of plates for use in heat exchangers. Alternating plates have walls extending perpendicular to the surface of the sheet such that, when the wall-bearing sheets are packed alternately with relatively flat sheets, channels are formed. The channels direct the flow of the fluid media through the heat exchanger structure. The surface of at least every second plate in a stack making up a heat exchanger structure has a surface which is formed to promote heat transfer without unduly raising the pressure drop of gas flowing through the heat exchanger. This is accomplished by providing a multiplicity of shallow depressions and projections on the surface of the plate. Each of at least every second plate in a stack has a surface having a multiplicity of parallel furrows extending obliquely with respect to the longitudinal axis of the channels which define the general direction of the flow of the gaseous media through the heat exchanger. The crest forming ridges between the furrows are periodically interrupted by depressions to break up the laminar flow of gaseous media in the vicinity of the plates in order to promote the heat transfer. However, as shown, for example in FIG. 7, the stack is assembled without regard to the relative positions of the depressions in adjacent plates, the plates being spaced by the walls of the channels formed in every other plate in the stack.

Prior art contact bodies which are assembled from a plurality of parallel and generally vertical contact sheets, having a plurality of parallel corrugations forming alternating apices in the contact sheets, and oriented such that the corrugations are disposed at an angle to the horizontal and such that the corrugations of adjacent sheets intercept one another, suffer from several disadvantages. For example, because the adjacent sheets of such prior art contact bodies are bonded together at the apices of the intersections of the corrugations of adjacent sheets, and no special effort has been made in the prior art to position these intersections with reference to the edges of the contact sheets, on the average, few intersections occur near the edges of the contact sheets. Thus, the intersections, which are the sites at which the adjacent sheets are bonded together, occur substantially only within the interior of the contact body. As a result, the edges of the contact body disposed toward the incoming fluid streams to be contacted often present an irregular cross section to the incoming fluid streams.

This irregularity may result from the inability to position alternating sheets in precisely the same orientation during assembly of the contact body, from damage to the edges of the contact body or its component sheets occuring during shipping of the sheets, or assembly or installation of the contact body, or from damage to the edges of the contact body occurring during use of the contact body. In any case, the irregular cross section presented by the edges decreases the efficiency of the contact body because the incoming streams of fluid are nonuniformly distributed through the contact body.

Further, the incoming fluid streams may cause the edges of these prior art contact bodies to vibrate. These edge vibrations may ultimately result in material fatigue, delamination of the contact sheets, bending of the edges, wear of the edges, and/or breakage of the edges of the contact sheets. Clearly, there is a need for a means for securing the edges of such contact bodies to increase the operational efficiency and life expectancy of the contact bodies.

Conventionally, in corrugated fill media having no special protuberances, spacer members, indentations, and the like, adhesive or solvent is applied to the apices of the corrugations on one side of a sheet by conventional application means such as a roller; and the next adjacent sheet is laid atop the first sheet such that the corrugations of the two sheets cross. The apex of the corrugations may be slightly flattened to provide an enlarged bonding surface. When the sheets are thermoformed from unplasticized polyvinylchloride, a solvent may be used to weld together the apical contacting portions of the corrugations on each of the sheets. Residual solvent is allowed to evaporate from the non-contacting portions of the sheets.

This assembly procedure has the disadvantage that it exposes a substantial proportion of the entire sheet surface, and in particular, the apices of the corrugations to the adhesive solvents which are employed to attack and fuse the sheet material together. The solvent exposure tends to embrittle and prematurely degrade synthetic polymeric materials, such as polyvinylchloride. This is undesirable.

SUMMARY OF THE INVENTION

One aspect of the present invention relates to a contact sheet, of the type having corrugations forming alternating apices in the contact sheet, the corrugations being substantially parallel and disposed at an angle to the horizontal, and adapted for assembly with a plurality of parallel and generally vertical like contact sheets to form a gas and liquid contact body, whereby the corrugations of one sheet cross the corrugations of an adjacent sheet at intersections of the apices, the improvement comprising positioner pads being so positioned in the apices of the corrugations of the contact sheet that when the contact sheets are assembled into a contact body, the positioner pads of one sheet abut the positioner pads of an adjacent sheet to form pairs of abutting positioner pads, at least about eighty percent of the intersections within the contact body containing the pairs of abutting positioner pads.

Another aspect of the present invention relates to a contact shee having positioner pads positioned in the apices proximate the edges of the contact sheet whereby when the sheets are assembled into a contact body, the positioner pads formed proximate the edges of one sheet abut positioner pads formed proximate the edges of an adjacent sheet to form pairs of abutting positioner pads at intersections proximate the edges of the contact body.

Another aspect of the present invention relates to a gas and liquid contact body, composed of a plurality of parallel and generally vertical corrugated contact sheets, wherein the corrugations form alternating apices in the sheets, the corrugations being disposed at an angle to the horizontal and wherein the corrugations are substantially parallel and adjacent sheets are oriented such that corrugations of an adjacent sheet at intersections of the apices, the improvement comprising positioner pads positioned in apices of the corrugations of the contact sheets, such that at least about eighty percent of the intersections of adjacent sheets contain abutting pairs of the positioner pads. Preferably, the positioner pads are formed at each intersection of the corrugations of adjacent sheets. It is also preferred that the positioner pads be substantially planar. In the presently preferred embodiment, the positioner pads are recessed into the apices of the corrugations of each contact sheet.

The positioner pads, which are structures formed in the contact sheets at the intersections of the apices of the corrugations of adjacent sheets, provide increased contact area between adjacent sheets, in comparison with those prior art contact sheets which provide essentially point-to-point contact at the intersections.

The present invention also provides corrugated contact sheets, wherein the corrugations are substantially parallel and form alternating apices in the contact sheets, and are disposed at an angle to the major axis of the contact sheet, such that the corrugations of adjacent contact sheets are adapted to intersect proximate the edges of the contact sheets. This class of intersections of the apices of the corrugations of adjacent sheets which occurs proximate the edge of sheets are identified hereafter as "edge-proximate" intersections. Contact sheets formed to make such edge-proximate intersections with adjacent sheets in a contact body may be referred to as "edge-bondable" contact sheets.

Positioner pads may be provided in at least eighty percent of the edge-proximate intersections of the edge-bondable contact sheets. This class of positioner pads may be referred to "edge-proximate" positioner pads.

The edge-proximate positioner pads may be adhesively bonded, thus edge-bonding or edge-gluing the adjacent sheets together. Prior art contact sheets, which are not provided with edge-proximate intersections or positioner pads, cannot be edge-bonded together. Edge-bonding provides improved contact bodies having greater mechanical strength than non-edge-bonded contact bodies of the prior art. Contact bodies of the present invention having edge-proximate intersections have more bonding sites providing a better bond than prior art contact bodies of similar dimensions and similar number of corrugations per sheet. The contact bodies of the present invention generally have one additional bonding site per corrugation than such prior art contact bodies.

In addition to this greater density of adjacent sheet intersections, the contact bodies of the present invention having edge-proximate intersections which are bonded together have a number of other advantages over otherwise comparable prior art contact bodies. First, these improved, edge-bonded contact bodies present a more regular and uniform cross section to incoming fluid streams, thus increasing the efficiency of the contact body in comparison with non-edge-bonded contact bodies of the prior art. Second, the likelihood that incoming fluid streams will cause the edges of the contact bodies to vibrate, ultimately resulting in material fatigue, delamination, edge bending, edge wear, and/or edge breakage, is substantially reduced. Thus, the working life expectancy of an edge-bonded contact body according to the present invention is increased in comparison with prior art contact bodies. Similarly, the likelihood that the contact body edges will be damaged during assembly, installation or repair of the contact body is reduced.

Preferably, positioner pads are formed at the edge-proximate intersections. Further, it is preferred that at least about eighty percent of the edge-proximate intersections contain these abutting pairs of edge-proximate positioner pads. In addition to such edge-proximate positioner pads, it is preferred that contact sheets additionally comprise positioner pads positioned in the apices of the corrugations at intersections other than intersection proximate the edges of the sheets. It is preferred that contact bodies formed from edge-bondable contact sheets additionally comprise positioner pads positioned in the apices of the corrugations of the contact sheets such that at least about eighty percent of the intersections of adjacent sheets contain pairs of abutting positioner pads.

It is especially preferred that the positioner pads in edge-bondable contact bodies be formed at each intersection of the corrugations of adjacent sheets. Preferably, these positioner pads are recessed into the apices of the corrugations of each edge-bondable contact sheet. These positioner pads are preferably substantially planar.

Although these contact sheets are referred to as "edge bondable," they may be fastened together by mechanical means such as by strapping; alternatively, they may be fastened together by adhesive bonding.

Several additional advantages are provided by the contact sheets and contact bodies of the present invention. When adhesive or solvent is used, the amount of adhesive or solvent necessary to bond together adjacent sheets is reduced in comparison to the prior art because the adhesive or solvent need only be applied to the individual positioner pads, rather than along the entire length of the apices of the corrugations. The positioner pads provide greater contact area between adjacent sheets, thereby increasing the strength and rigidity of the assembled contact body.

Further, when the positioner pads are recessed within the apices of the corrugations, the adjacent sheets of the contact body are self-registering. This makes assembly of the contact body from the individual sheets easier, increasing production rates and reducing costs. Superior structural stability and strength are associated with the larger contact points provided by the positioner pads, especially when the sheets are assembled by adhesively bonding the sheets together at the positioner pads. This is particularly advantageous when the contact bodies are used in heavy traffic areas, under heavy ice loads, or in deep, heavy, trickling filter and gas scrubber applications which may have to bear heavy loads.

The self-registering sheets may be held together to form contact bodies without solvent or adhesive, as with straps or other mechanical means. This allows for replacement of damaged sheets in contact bodies, simplifies cleaning of badly clogged contact bodies, and eliminates the exposure of workers to toxic solvents during assembly.

An additional advantage provided by the positioner pads is that the positioner pads permit precision assembly of individual sheets into the contact body to produce a consistently uniform media pack. Because the gas and liquid which is circulated through the contact bodies tend to take the path of least resistance, uniformity of the spacing of the fill sheets within the contact body is important to maximize efficiency.

In addition, when individual contact bodies are assembled to provide a fill for applications such as contact tower fill media, the symmetrical outside geometry of each individual pack of sheets making up the contact body allows for a smooth transition of air and water into opposing layers.

BRIEF DESCRIPTION OF THE DRAWING

For the purpose of illustrating the invention, there are shown in the drawings forms which are presently preferred; it being understood, however, that this invention is not limited to the precise arrangements and instrumentalities shown.

FIG. 3 is a perspective view of one embodiment of a contact body according to the present invention in a generally flat orientation prior to being installed in a cooling tower or the like.

DETAILED DESCRIPTION

The contact bodies of the present invention may be assembled from sheets which are made of a variety of different materials. For example, the individual sheets may be made from thermoplastic material such as plasticized or unplasticized polyvinylchloride, polystyrene, and engineering thermoplastics such as that sold by General Electric Company under the trademark NORYL, metals such as galvanized steel, aluminum, copper, or the like, materials such as asbestos or cellulose, or alloys of thermoplastic materials, such as alloys of polyvinylchloride with other thermoplastic materials, composite materials such as fibrous cellulosic stock impregnated with a thermoplastic resin, or the like.

Examples of other resins and engineering resins which may be used include acetals, nylons, polyphenylene oxides, polycarbonates, polyether sulfones, polyaryl sulfones, polyethylene terephthalates, polyetheretherketones, polypropylenes, polysilicones, polyphenylene sulfides, polyionomers, polyepoxies, polyvinylidene halides, and the like.

As will be recognized by those skilled in the art, the choice of a particular material is dictated by the application conditions. For example, in relatively low temperature cooling tower applications, a polyvinylchloride resin having little or no plasticizer is preferred. In applications in which high temperature liquids are encountered, other materials may be preferred. For example, when water temperatures in excess of about 160 degrees Fahrenheit are encountered, an engineering thermoplastic material such as NORYL resin may be employed.

The individual contact sheets of the contact body may be manufactured by any conventional technique which is appropriate for material having the composition selected. For example, when the individual sheets of the contact body are to be manufactured from flat stock material of a thermoplastic polymeric resin such as unplasticized polyvinylchloride, the individual contact body sheets may be thermally formed by a process such as vacuum forming, molding, hot stamping, or the like.

To provide a completely interlocked structure, it is preferred that recessed positioner pads be formed at each of the loci of intersection of the corrugations of adjacent sheets. However, when positioner pads are not recessed into the contact sheet corrugations at least about eighty percent of the intersections should contain pairs of abutting positioner pads to provide sites for attaching adjacent sheets to one another.

Figure 1:
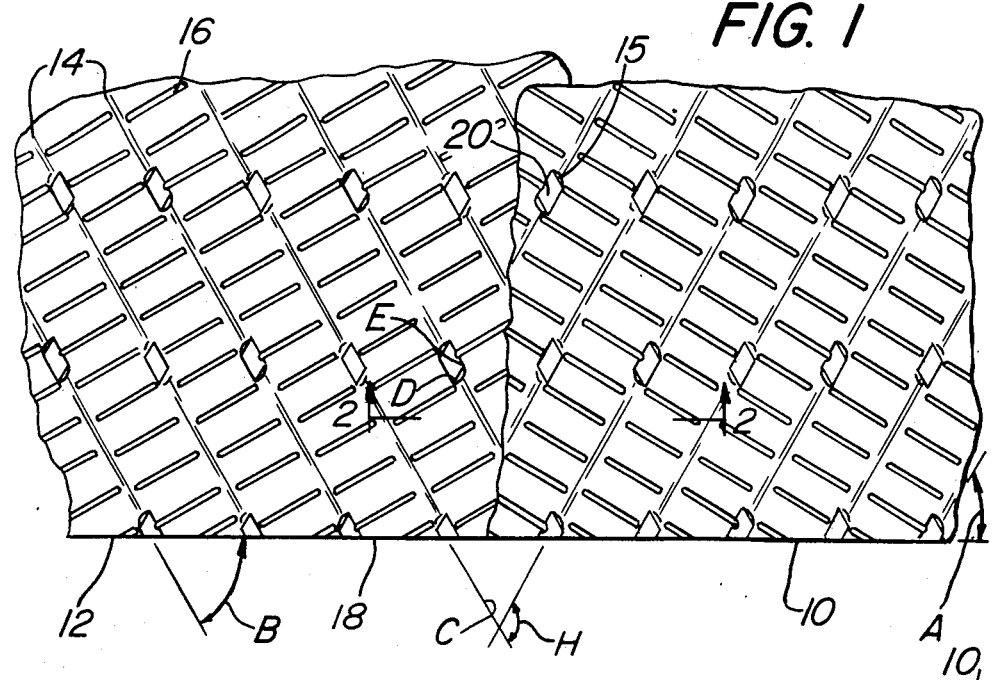
FIG. 1 is a partial front view of a contact body of the present invention, with the front sheet partly broken away to reveal the next adjacent sheet.
Figure 2:
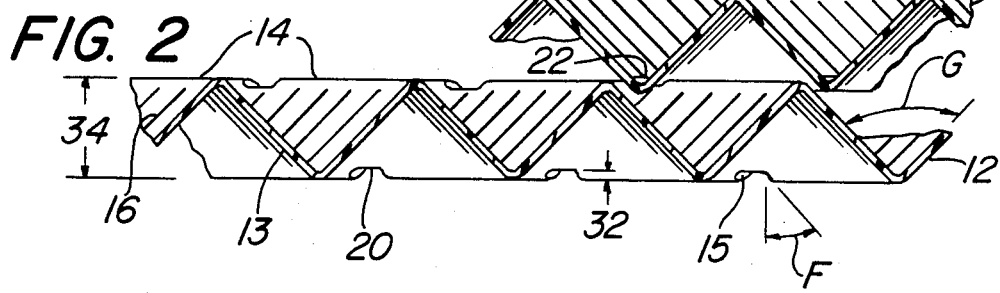
FIG. 2 is a partial cross-sectional view of the embodiment of the contact body taken along line 2—2 in FIG. 1.

While planar positioner pads are preferred, the positioner pads may have other surface topologies such that at least a portion of the surface of the positioner pads of adjacent sheets contact each other. For example, the positioner pads may be of two classes, for example, male and female, and the positioner pads of the male class may all be disposed in the apices of the corrugations on one major surface of the sheet while the positioner pads of the female class are all disposed in the apices of the corrugations on the opposite major surface of the sheet. Individual sheets may then be assembled with male positioner pads interlocking with female positioner pads of an adjacent sheet. It is preferred that the chosen positioner pads geometry be sufficiently symmetric so that only a single type of contact sheet need be manufactured for assembly into contact bodies. For example, when the recessed planar positioner pads of the embodiment illustrated in FIGS. 1 and 2 are used, the contact sheets may be shipped with the corrugations of one sheet parallel to and fitting within the corrugations of adjacent sheets. The contact body may be formed on site from a stack of such sheets by rotating alternate sheets one hundred and eighty degrees about the major axis of the sheet and subsequently bonding or otherwise securing together adjacent sheets.

Referring to the drawings in detail, where like referenced characters indicate like elements, there is shown in FIG. 1 a partial front view of a contact body of a presently preferred embodiment of the present invention. Only two of many adjacent sheets are illustrated in FIG. 1 for purposes of clearly describing the invention. Front sheet 10 is adjacent to sheet 12. Sheets 10 and 12 have four edges, but only bottom edges 18 are illustrated for the sake of clarity. The individual sheets are corrugated with major face corrugations 13 (best illustrated in FIG. 2) having front and rear apices 14 (upper and lower apices 14 as illustrated in FIG. 2). The corrugations of sheet 10 are oriented at an angle A to the horizontal. The corrugations of adjacent sheet 12 are oriented at an angle B to the horizontal. Angles A and B may be the same in absolute value, or they may be different. For example, the angles A and B may both be about 30 degrees. The angles may vary depending on the use made of the contact bodies, such as whether they are used as wet deck fill in evaporative coolers, and if so, whether they are used in concurrent-flow units, cross-flow units or counterflow units, for example. The corrugations 13 of adjacent sheets 10 and 12 cross one another. As best illustrated in FIG. 2, positioner pads 20 are formed at the intersection 22 of the apices 14 of the corrugations 13 of sheets 10 and 12.

FIG. 2 illustrates a partial cross-sectional view of two sheets of a contact body of a preferred embodiment taken along line 2—2 of FIG. 1. In this embodiment, the positioner pads 20 are recessed into the apices 14 of the corrugations of the individual sheets. The recessed positioner pads 20 are spaced along the apices 14 so that they are positioned at the intersections 22 of adjacent sheets. The recessed positioner pads permit adjacent sheets to overlap slightly. The plane defined by the apices of the corrugations of one sheet lies inside the plane defined by the apices of the adjacent sheet.

Although the positioner pads of the presently preferred illustrated embodiment are recessed into the contact sheets, other positioner pad structures may be employed. For example, the positioner pads may be substantially planar contact surfaces formed at the apices of the corrugations such that the positioner pads lie within the planes defined by the apices of the corrugations. In this case, the apices of adjacent sheets lie in substantially the same plane.

FIG. 1 illustrates the presently preferred edge alignment of contact sheets forming contact bodies according to the present invention. The edges 18 of the contact sheets illustrated in FIG. 1 have edge-proximate positioner pads located in the apices 14 of the corrugations 13 at or near the edges of the contact sheets. The edges 18 of the contact sheets may have a flange extending approximately three sixteenths of an inch (0.5 cm) wide. The exact locus of intersection of the apices 14 of the corrugations 13 of adjacent sheets may be positioned at a short distance inwardly from the perimeter edges of the contact sheet so that the edge-proximate positioner pads, which are recessed and substantially planar in the illustrated embodiment, provide about the same area as the non-edge-proximate positioner pads 20 for contacting adjacent sheets.

Figure 3:
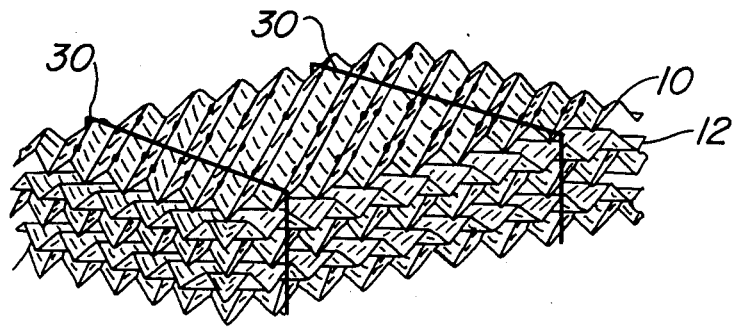

In order to provide edge bondable contact sheets, the geometry and dimensions of the contact sheets, and the geometry, spacing and orientation of the corrugations in the contact sheets must be carefully considered. While the contact sheets illustrated in FIGS. 1–3 are generally rectangular in plan view, the sheets may assume other shapes. The width, length and thickness of the contact body are usually fixed by the corresponding dimensions of the cooling tower, filter bed, or other apparatus in which the contact body is to be used. Thus, the angular orientation of the corrugations, and especially the relative location of the apices of the corrugations in adjacent sheets, must be selected to provide edge-bondable contact sheets.

In the embodiment illustrated in FIG. 1 positioner pads 20 are formed at edge-proximate insections of sheets 10 and 12. It is preferred that at least about eighty percent of the edge proximate intersections of the apices of adjacent sheets contain these abutting pairs of edge-proximate positioner pads. In addition to the edge-proximate positioner pads, contact sheets 10 and 12 illustrated in FIG. 1 additionally comprise positioner pads 20 positioned in the apices of the corrugations at intersections other than intersections proximate the edges of the sheets. Contact bodies formed from edge-bondable contact sheets such as those illustrated in FIG. 1 may additionally contain positioner pads positioned in the apices of the corrugations of the contact sheets such at least about eighty percent of the intersections of adjacent sheets contain pairs of abutting positioner pads.

The positioner pads in edge-bondable contact bodies may be formed at each intersection of the corrugations of adjacent sheets. These positioner pads may be recessed at the apices of the corrugations of each edge-bondable contact sheet, and may be substantially planar.

When the positioner pads 20 are recessed into the apices of the corrugations, as illustrated in FIG. 2, it is preferred that the recesses extend only slightly into the corrugations. Preferably, the positioner pads are recessed deeply enough so as to provide a mechanically secure interlock between adjacent sheets, but not so far so as to either reduce the mechanical strength of individual sheets or to significantly reduce the flow of gas, such as air, through the contact body. Preferably, the recess depth 32 of the positioner pad into the apex of the corrugation will be less than about seven percent of the sheet depth 34 of an individual sheet. For example, in a contact sheet having a depth of about 0.81 iches (2.1 cm), the recess depth 32 will be less than about 0.036 inches (0.091 cm).

The exact shape and size of the positioner pads is determined by a number of factors including the depth to which they are recessed into the corrugations, the cross sectional shape of the corrugations, and the relative angle which the corrugations on adjacent sheets intersect with respect to one another. For example, as the depth to which the positioner pads are recessed into the corrugations increases, the surface area of generally planar positioner pads increases. By "generally planar" it is meant that more than one half of the area of the positioner pad is planar.

When the corrugations of adjacent sheets are oriented perpendicular to one another, planar positioner pads will be square. When the the corrugations on adjacent sheets are oriented at any other angle, planar positioner pads will form a rhombus having interior acute angles D equal to the acute angle C formed by the intersecting corrugations of adjacent sheets and interior obtuse angles E equal to the obtuse angle H formed by the intersecting corrugations. As illustrated in FIG. 2, the planar surface of planar positioner pad 20 is connected by walls 15 to the apices 14 of the corrugations. The walls adjacent to the surface of the planar positioner pad may be themselves planar or may define more complex three-dimensional shapes. When the surface of the corrugations in the sheets extending between the apices 14 are generally planar it is preferred that the walls 15 adjacent to the positioner pads 20 also be generally planar. In this case the shape of the walls 15 will be triangular, as will be the shape of the projection of the walls 15 in the plane of the positioner pads as illustrated in FIG. 1. When the walls 15 are planar, it is preferred that the walls 15 make an angle F with a perpendicular to the surface of the positioner pad 20, such that the walls 15 substantially contact the surface of the corrugations 13 in the adjacent sheet which is proximate the mating positioner pad in the adjacent sheet. In this case, the angle F is one-half the angle G defined by the apices 14 of the corrugations themselves.

When the corrugations are not planar, as, for example, in the case of sinusoidal corrugations, it is preferred that the walls be shaped so as to provide surfaces which mate with the surface of the corrugations proximate the positioner pads in adjacent sheets, thus providing additional contact area between adjacent sheets proximate the positioner pads. In the case of sinusoidal corrugations, it is preferred that the walls 15 adjacent to the positioner pads 20 have a generally concave shape which contacts the surface of the corrugations in the adjacent sheet proximate the abutting positioner pad.

In any case, the shape and disposition of the walls 15 must be such that they do not interfere with the contact of positioner pads 20 of adjacent sheets.

Although the corrugations illustrated in the drawing show zigzag corrugations, sinusoidal corrugations or corrugations or folds defining a different cross-sectional shape may also be employed. In addition to the principal or major face corrugations 13 in the sheets, the sheets may also have minor corrugations or other surface treatment, such as raised and/or lowered bars 16 oriented generally perpendicular to the direction of the major face corrugations 13, as illustrated in FIGS. 1 and 2. The surface treatment, such as bars 16, may serve to further increase the surface area of individual sheets, to retard advantageously the rate of flow of fluid through the contact body, to affect or control the turbulence of fluid flow through the contact body, or the like. The surface treatment does not extend into the edges 18 of the contact sheets illustrated in FIG. 1.

FIG. 3 illustrates a contact body according to the present invention, assembled from a plurality of individual contact sheets without using adhesive bonding. The contact body is assembled by stacking individual sheets, each of depth 34, and by securing the stacks with straps 30.

The individual sheets of the contact body illustrated in FIG. 3 are generally rectangular in shape, having major and minor axes parallel to the long and short edges of the sheets, respectively. Further, the contact body illustrated in FIG. 3 contains sheets which are not edge-bondable. Even though this is not the presently preferred embodiment, it is an acceptable alternative embodiment of contact bodies made from contact sheets according to this present invention. When a contact body is assembled from sheets having recessed positioner pads as shown in FIG. 2, although the use of adhesive or solvent is preferred in most instances to bond the sheets together, no adhesive or solvent need be used to secure individual sheets together. Instead, the stack of sheets may be secured together by straps 30 encircling the contact body in at least two spaced locations, as illustrated in FIG. 3. Although the contact sheets may be secured together by other mechanical compression means, such as bolts, clamps, cables, or the like, it is not necessary to do so because of the positive, secure interconnection provided by the interconnected positioner pads 20.

The straps 30 may be made of any conventional strapping material including metal such as steel, composites of synthetic polymers which contain fibrous materials, non-composite synthetic polymeric materials, and the like. Preferably, the strapping material is one which resists exposure to the environmental conditions to which the contact body is to be exposed while in use. For example, when the contact body is to be used as fill for cooling towers in which air is used to cool water, is is preferred that the straps be made from a material which resists degradation resulting from exposure to elevated temperatures and moisture. For example, polypropylene strapping, such as one-eighth inch wide by 0.040 (0.10 cm) inch thick polypropylene strapping, may be used.

The present invention may be embodied in other specific forms without departing from the spirit or essential attributes thereof and, accordingly, reference should be made to the appended claims, rather than to the foregoing specification as indicating the scope of the invention.

I claim:

1. In a gas and liquid contact body, composed of a plurality of parallel and generally vertical corrugated contact sheets, wherein the corrugations form alternating apices in the sheets, the corrugations being disposed at an oblique angle to the horizontal and wherein the corrugations are substantially parallel and adjacent sheets are oriented such that corrugations of one sheet cross the corrugations of an adjacent sheet at intersections of the apices, the improvement comprising generally planar positioner pads positioned in apices of the corrugations of the contact sheets, such that at least about eighty percent of the intersections of adjacent sheets contain abutting, connected pairs of the positioner pads.

2. A contact body according to claim 1 wherein the sheets comprising the contact body are fastened together by adhesive bonds between the pairs of abutting positioner pads.

3. A contact body according to claim 1 wherein the positioner pads are formed at each intersection.

4. A contact body according to claim 3 wherein the positioner pads are recessed into the apices of the corrugations of each contact sheet.

5. In a gas and liquid contact body, composed of a plurality of parallel and generally vertical corrugated contact sheets, wherein the corrugations form alternating apices in the sheets, the corrugations being disposed at an oblique angle to the horizontal and wherein the corrugations are substantially parallel and adjacent sheets are oriented such that corrugations of one sheet cross the corrugations of an adjacent sheet at intersections of the apices, the improvement comprising connected pairs of abutting, generally planar positioner pads formed in the apices of contact sheets at intersections proximate the edges of adjacent sheets.

6. A contact body according to claim 5 wherein at least about eighty percent of the intersections proximate the edges of adjacent sheets contain pairs of abutting positioner pads.

7. A contact body according to claim 5 wherein the sheets comprising said contact body are fastened together by adhesive bonds between the pairs of abutting positioner pads.

8. A contact body according to claim 5 further comprising pairs of abutting positioner pads positioned in at least about eighty percent of the intersections of adjacent sheets.

9. A contact body according to claim 8 wherein positioner pads are formed at each intersection.

10. A contact body according to claim 9 wherein the positioner pads are recessed into the apices of the corrugations of each contact sheet.

* * * * *